United States Patent
Huang et al.

(10) Patent No.: US 9,989,001 B2
(45) Date of Patent: Jun. 5, 2018

(54) DISCRETE TIME RATE-BASED MODEL PREDICTIVE CONTROL METHOD FOR INTERNAL COMBUSTION ENGINE AIR PATH CONTROL

(71) Applicants: Toyota Motor Engineering & Manufacturing North America, Inc., Erlanger, KY (US); The Regents of the University of Michigan, Ann Arbor, MI (US)

(72) Inventors: Mike Huang, Ann Arbor, MI (US); Ilya Kolmanovsky, Novi, MI (US)

(73) Assignees: Toyota Motor Engineering & Manufacturing North America, Inc., Plano, TX (US); The Regents of the University of Michigan, Ann Arbor, MI (US)

( * ) Notice: Subject to any disclaimer, the term of this patent is extended or adjusted under 35 U.S.C. 154(b) by 238 days.

(21) Appl. No.: 14/949,723

(22) Filed: Nov. 23, 2015

(65) Prior Publication Data

US 2016/0076473 A1 Mar. 17, 2016

Related U.S. Application Data

(63) Continuation-in-part of application No. 13/724,957, filed on Dec. 21, 2012, now Pat. No. 9,581,080.

(51) Int. Cl.
*F02D 41/00* (2006.01)
*F02D 41/14* (2006.01)
(Continued)

(52) U.S. Cl.
CPC .......... *F02D 41/1401* (2013.01); *F02B 33/40* (2013.01); *F02B 47/08* (2013.01);
(Continued)

(58) Field of Classification Search
CPC ............ F02D 41/1401; F02D 41/0072; F02D 41/0077; F02D 41/0007; F02D 41/2409;
(Continued)

(56) References Cited

U.S. PATENT DOCUMENTS 5,527,238 A * 6/1996 Hrovat ................. F16H 61/143
477/166
5,771,482 A 6/1998 Rizzoni
(Continued)

FOREIGN PATENT DOCUMENTS

EP 1767760 A2 3/2007
FR 2764941 A1 12/1998
(Continued)

OTHER PUBLICATIONS

Bemporad et al., "The explicit linear quadratic regulator for constrained systems," Automatica, vol. 38, pp. 3-20, 2002.
(Continued)

*Primary Examiner* — Hieu T Vo
*Assistant Examiner* — Sherman Manley
(74) *Attorney, Agent, or Firm* — Christopher G. Darrow; Darrow Mustafa PC (57) ABSTRACT

A discrete time rate-based model predictive controller for air path control for a diesel engine regulates VGT position and EGR valve position to specified set points by coordinated control of intake manifold air pressure and EGR rate. The controller may be configured to measure or estimate at least one of the intake manifold pressure and EGR rate. A non-linear discrete time rate-based predictive model may be used, as developed by the controller.

10 Claims, 10 Drawing Sheets

(51) Int. Cl.
*F02M 25/07* (2006.01)
*F02B 33/40* (2006.01)
*F02B 47/08* (2006.01)
*F02D 41/24* (2006.01)

(52) U.S. Cl.
CPC ..... *F02D 41/0072* (2013.01); *F02D 41/0077* (2013.01); *F02M 25/0724* (2013.01); *F02M 25/0771* (2013.01); *F02D 41/0007* (2013.01); *F02D 41/2409* (2013.01); *F02D 2041/141* (2013.01); *F02D 2041/1412* (2013.01); *F02D 2041/1416* (2013.01); *F02D 2041/1433* (2013.01); *F02D 2041/1434* (2013.01); *Y02T 10/47* (2013.01)

(58) Field of Classification Search
CPC ....... F02D 2041/141; F02D 2041/1416; F02D 2041/1434; F02D 2041/1433; F02D 2041/1412; F02B 47/08; F02B 33/40; Y02T 10/47
See application file for complete search history.

(56) References Cited

U.S. PATENT DOCUMENTS

| | | | |
|---|---|---|---|
| 6,990,401 | B2 | 1/2006 | Neiss et al. |
| 7,004,501 | B2 | 2/2006 | Schneider et al. |
| 7,016,779 | B2 | 3/2006 | Bowyer |
| 7,076,953 | B2 | 7/2006 | Kreso |
| 7,275,374 | B2 | 10/2007 | Stewart et al. |
| 7,328,577 | B2 | 2/2008 | Stewart et al. |
| 7,415,389 | B2 | 5/2008 | Stewart et al. |
| 7,877,195 | B2 | 1/2011 | Angeby |
| 8,090,456 | B2 | 1/2012 | Karpman et al. |
| 8,229,872 | B2* | 7/2012 | Gilhuly ................. G05B 17/02 435/3 |
| 8,295,951 | B2 | 10/2012 | Crisalle et al. |
| 2005/0131620 | A1 | 6/2005 | Bowyer |
| 2005/0166900 | A1 | 8/2005 | Song et al. |
| 2006/0137346 | A1* | 6/2006 | Stewart .................. F02D 23/02 60/605.2 |
| 2006/0137347 | A1* | 6/2006 | Stewart .................. F02D 23/00 60/605.2 |
| 2007/0039589 | A1* | 2/2007 | Stewart ................ F02D 31/007 123/352 |
| 2007/0101977 | A1* | 5/2007 | Stewart ............... F02D 41/0007 123/679 |
| 2009/0222245 | A1 | 9/2009 | Hashimoto et al. |
| 2010/0268353 | A1 | 10/2010 | Crisalle et al. |
| 2011/0264353 | A1* | 10/2011 | Atkinson ............ F02D 41/1402 701/102 |
| 2011/0301723 | A1 | 12/2011 | Pekar et al. |
| 2014/0174413 | A1* | 6/2014 | Huang .................... F02B 47/08 123/568.18 |
| 2014/0174414 | A1* | 6/2014 | Huang ................. F02D 41/1401 123/568.21 |
| 2014/0316683 | A1* | 10/2014 | Whitney ............... F02D 11/105 701/108 |
| 2015/0275731 | A1* | 10/2015 | Yasui ..................... F01N 3/208 422/105 |

FOREIGN PATENT DOCUMENTS

| | | |
|---|---|---|
| JP | 2002070621 A | 3/2002 |
| JP | 2010249057 A | 11/2010 |
| JP | 2012167654 A | 9/2012 |

OTHER PUBLICATIONS

Bemporad et al., Hybrid Toolbox—User's Guide, Dec. 2003, http://www.dii.unisi.il/hybrid/loolbox.

Bemporad et al., Model predictive control based on linear programming-the explicit solution. IEEE Transactions on Automatic Control, 47, pp. 1974.1985, 2002.

Bemporad, "Model Predictive Control Design: New Trends and Tools", Proceedings of the 45lh IEEE Conference on Decision & Control, Manchester Grand Hyatt Hotel, San Diego, CA, USA, Dec. 13-15, 2006, pp. 6678-6683.

Betti et al., "An MPC algorithm for offset-free tracking of constant reference signals", 51 st IEEE Conference on Decision and Control, Dec. 10-13, 2012. Maui, Hawaii, USA, pp. 5182-5187.

DeCastro, Rate-Based Model Predictive Control of Turbofan Engine Clearance, Journal of Propulsion and Power, vol. 23, No. 4, Jul.-Aug. 2007.

Di Cairano et al., An MPC design flow for automotive control and applications to idle speed regulation, Proceedings of the 47th IEEE Conference on Decision and Control, Cancun, Mexico, Dec. 9-11, 2008.

Ferreau et al., (2008). An online active set strategy to overcome the limitations of explicit MPC. International Journal of Robust and Nonlinear Control, 18, 816-830.

Grancharova et al., Explicit Nonlinear Model Predictive Control—Theory and Applications, Lecture Notes in Control and Information Sciences, vol. 429, Mar. 2011.

Hermans et al., "Low-complexity Model Predictive Control of Electromagnetic Actuators with a Stability Guarantee", undated in 6 pages, Jun. 2009.

International Search Report and Written Opinion for International Application No. PCT/US2013/076391 dated Apr. 1, 2014 (7 pgs).

Jung et al., Control-Oriented Linear Parameter-Varying Modelling of a Turbocharged Diesel Engine, CCA 2003. Proceedings of 2003: ieexplore. Retrieved from the Internet at: http://citeseerx.isl.psu.edu/viewdoc/download?doi=10.1.1.228.6126&rep=rep1&lype=pdf.

Kvasnica et al., Multi-Parametric Toolbox (MPT), 2004, Available: http://conlrol.ee.ethz.ch/ mpt.

Ortner et al., Predictive Control of a Diesel Engine Air Path, IEEE Transactions on Control Systems Technology, vol. 15, No. 3, May 2007.

Wahlstrom et al., EGR-VGT Control and Tuning for Pumping Work Minimization and Emission Control, IEEE Transactions on Control Systems Technology, vol. 18, No. 4, Jul. 2010. Retrieved from the Internet at: http://umu.diva-portal.org/smash/gel/diva2:218335/FULL TEXT01.

Wang, "A Tutorial on Model Predictive Control: Using a Linear Velocity-Form Model", Dev. Chem. Eng. Mineral Process. 12(516), 2004, pp. 573-614.

DeCastro, Jonathan A., "Rate-Based Model Predictive Control of Turbofan Engine Clearance," NASA, prepared for the 42nd Joint Propulsion Conference and Exhibit, NASA/CR-2006-214419 (2006).

* cited by examiner

EGR Valve Position (Percent Open): Measured Versus Computed Based on Inversion of EGR flow from Steady-State Data Set.

FIG. 6

VGT Duty Cycle: Measured Versus Computed Based on Inversion of VGT Lift from Steady-State Data Set

FIG. 7

Overshoot Constraint Enforcement with RB-MPC for Various Values of $O_{overshoot}$

FIG. 8

50 Step Predicted Trajectories Starting at Times 26, 26.5, and 27s Trajectories with RB-MPC and Overshoot Constraint of 0kPa Enforced 20 Steps Ahead

DISCRETE TIME RATE-BASED MODEL PREDICTIVE CONTROL METHOD FOR INTERNAL COMBUSTION ENGINE AIR PATH CONTROL

CROSS REFERENCE TO CO-PENDING APPLICATION

This application is a continuation-in-part of co-pending U.S. patent application Ser. No. 13/724,957, filed on Dec. 21, 2012, titled RATE-BASED MODEL PREDICTIVE CONTROL METHOD FOR INTERNAL COMBUSTION ENGINE AIR PATH CONTROL, the entire contents of which are incorporated herein by reference in its entirety.

TECHNICAL FIELD

The present description generally relates to methods and controls for internal combustion engines and, more particularly, to methods for controlling diesel engines.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Modern diesel engines use variable geometry turbines (VGT) to increase the amount of air supplied to the engine cylinders. The VGT varies the angle of the turbine stator inlet vanes to change the amount of air supplied to the engine cylinders.

In addition to providing optimum performance and fuel economy, modern diesel engines must also meet stringent federal regulations on emissions, particularly, particulate matter and nitrogen oxides. In order to meet all of these requirements, diesel engines with a VGT also use an exhaust gas recirculation (EGR) valve that has a variable controlled position to recirculate varying amounts of engine exhaust gases back into the engine cylinders for more complete combustion and reduced engine emissions.

As the engine operates over a large range of operating conditions, including engine speed, fuel usage, engine load, etc., one and typically multiple controllers are embedded in the engine control unit (ECU) to control various engine actuators in response to sensors detecting engine performance in order to optimize engine performance, emissions, etc.

The use of Model Predictive Control (MPC) is growing for engine control. A standard MPC approach incorporates integral type action to guarantee zero state-to-state error that adds additional integral states to the predictive control model. The MPC model uses a number of different engine operating ranges (fuel rate and engine speed), and develops a controller for each range to control the engine actuators.

In a specific example of model predictive control applied to diesel engine airflow, the flows in the engine are controlled using the variable geometry turbine (VGT), EGR throttle, and an EGR valve actuator. These systems are strongly coupled and are highly, non-linear.

However, prior applications of model predictive controllers to internal combustion engines and, in particular to diesel engines have utilized multiple operating ranges of engine performance, each of which has required a separate predictive controller. Further, each predictive controller uses integral type action that presents problems with overshoot restraints of controlled engine variables.

It would be desirable to provide model predictive controller for use with an internal combustion engine, which has a minimal number of operating ranges for reduced computation time, and memory storage requirements, while at the same time providing zero state-to-state tracking error of engine controlled performance variables.

SUMMARY

This section provides a general summary of the disclosure, and is not a comprehensive disclosure of its full scope or all of its features.

In various aspects, the present teachings provide a system for optimizing engine operation. The system may include an internal combustion engine, such as a diesel engine, and a controller. The controller may be configured to control a variable geometry turbine (VGT) and an exhaust gas recirculation (EGR) valve during engine operation. The controller develops a discrete time rate-based predictive model responsive to engine operating parameters, such as engine intake manifold pressure and EGR rate. The controller uses the discrete time rate-based predictive model to generate a VGT position and an EGR valve position.

In other aspects, the present teachings provide a method for controlling an internal combustion engine. The method may include obtaining intake manifold pressure and EGR rate measurements or estimates. The method may also include developing, using a controller, a discrete time rate-based predictive model responsive to the intake manifold pressure and EGR rate measurements or estimates. A VGT position and an EGR valve position may be generated, by the controller, using the discrete time rate-based predictive model.

In still other aspects, the present teachings provide a non-transitory computer storage media having embodied thereon computer-useable instructions that, when executed, perform a method for controlling an internal combustion engine. The method may include obtaining intake manifold pressure and EGR rate measurements or estimates. The method may also include developing, using a controller, a discrete time rate-based predictive model responsive to the intake manifold pressure and EGR rate measurements or estimates. A VGT position and an EGR valve position may be generated, by the controller, using the discrete time rate-based predictive model.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The various features, advantages and other uses of the present engine control method will become more apparent by referring to the following detailed description and drawing in which.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

Figure 1:
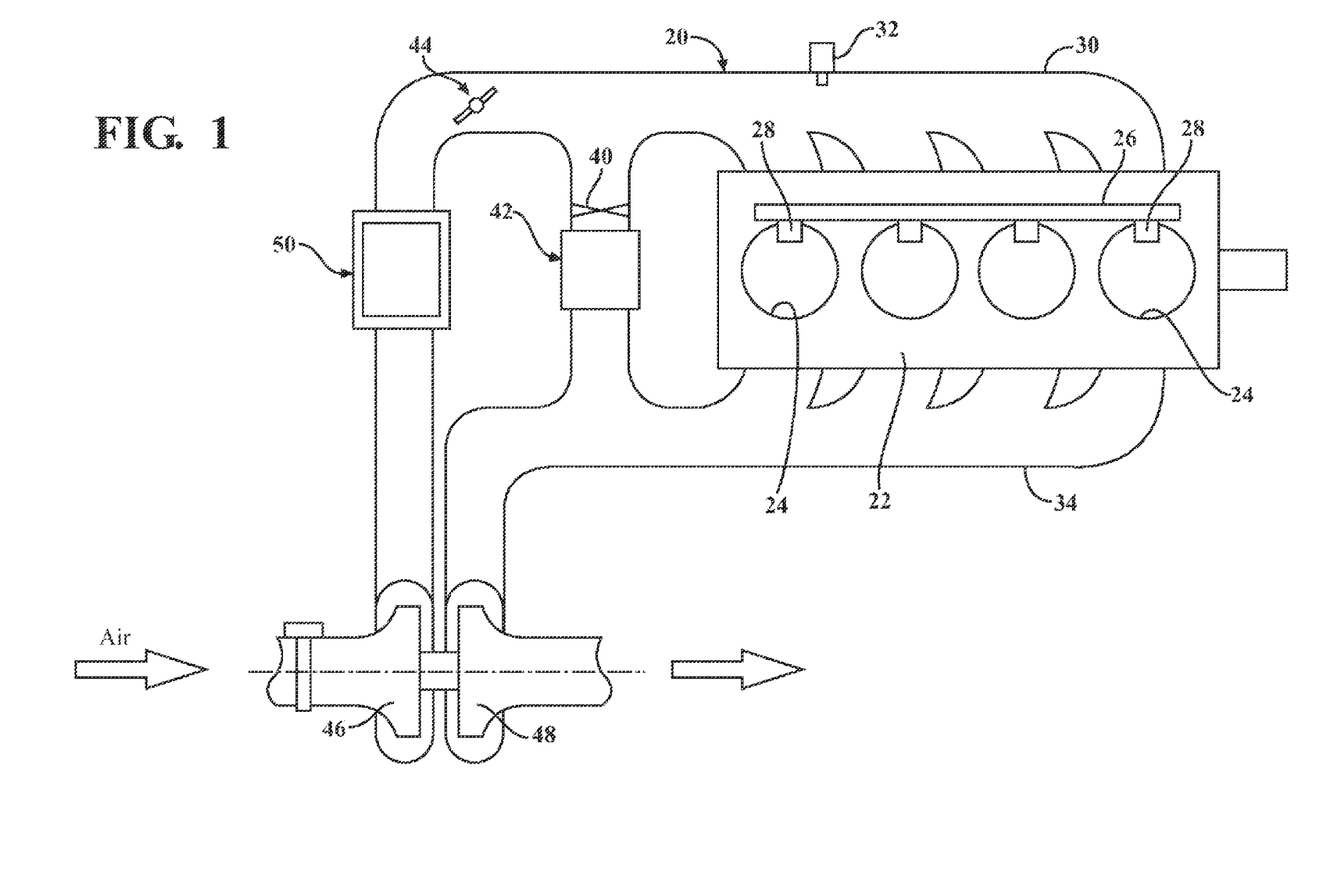
FIG. 1 is a pictorial representation of a diesel engine using a rate-based predictive model controller.

Referring now to FIG. 1, an internal combustion engine 20, described hereafter by example as a diesel engine, includes an engine block 22 housing a plurality of cylinders 24. A fuel rail 26 connected to a fuel supply, not shown, supplies diesel fuel to a plurality of fuel injectors 28 with one fuel injector provided for each cylinder 24.

An intake manifold 30 is coupled to the cylinders 24 for supplying intake air to each cylinder. An intake manifold pressure sensor 32 is coupled to the intake manifold 30 for measuring intake manifold air pressure.

An exhaust manifold 34 carries combustion gases from the cylinders 24 away from the engine block 22.

An EGR valve 40 is coupled in a bypass path between the intake manifold 30 and the exhaust manifold 34 to recirculate a portion of the exhaust gases from the exhaust manifold 34 back into the intake manifold 32 for supply to the cylinders 24. An EGR cooler 42 may be coupled in the bypass path along with the EGR valve 40.

An EGR throttle 44 is mounted in the airflow path from the compressor 46 of the variable geometry turbine (VGT) 48 to control gas circulation.

An intercooler 50 may be mounted in the intake air path ahead of the EGR throttle 44.

The variable geometry turbine 48, by controlling the angle of the turbine input vanes, controls the intake manifold pressure via the compressor 46.

Figure 2:
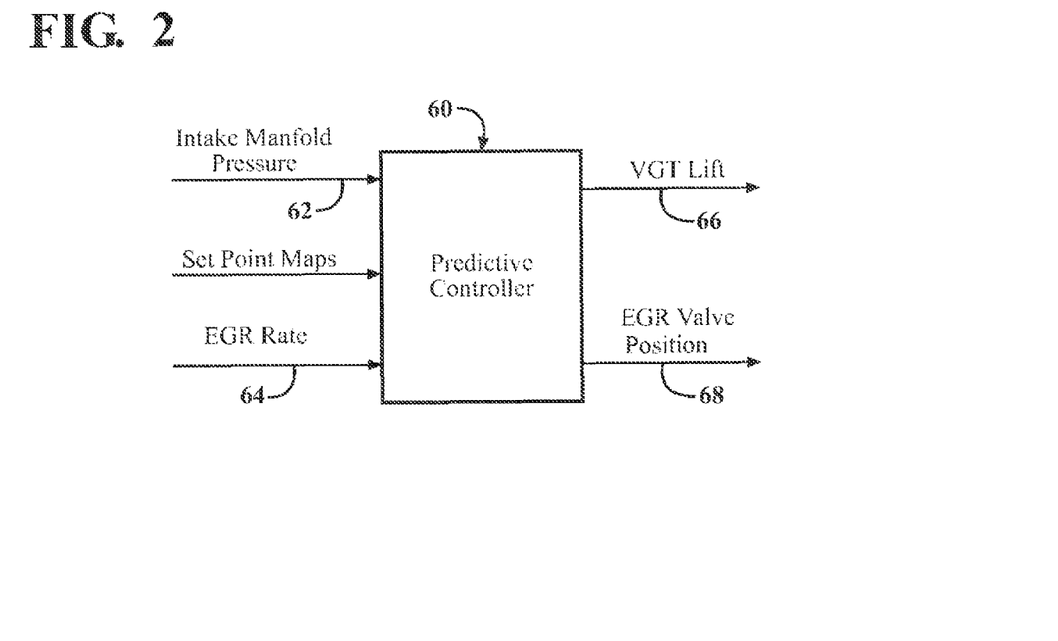
FIG. 2 is a block diagram showing the inputs and outputs to the rate-based predictive model controller.

According to the present methods, a rate-based predictive model control (RB-MPC) for the engine 20 uses a plurality of control inputs, such as intake manifold pressure 62 and EGR rate 64 as shown in FIG. 2. Partial non-linear inversion, as described hereafter, is used to backtrack the two inputs 62 and 64 to VGT position and EGR valve position, respectively. Partial inversion reduces the degree of model nonlinearity, and is a first step toward reducing the number of zones to cover engine operating range and hence computational complexity.

Partial inversion also avoids the need to deal with DC gain reversal. The controller 60 design uses partitioning of the engine operating range, composed of engine speed and fuel rate, for reduced order linearized engine models within each zone of operation. Only a single zone may be used for good tracking performance under control and state constraints. Thus, the ROM usage in the ECU can be reduced, as well as controller calibration time. A separate controller can be employed for use of the EGR throttle.

Figure 3:
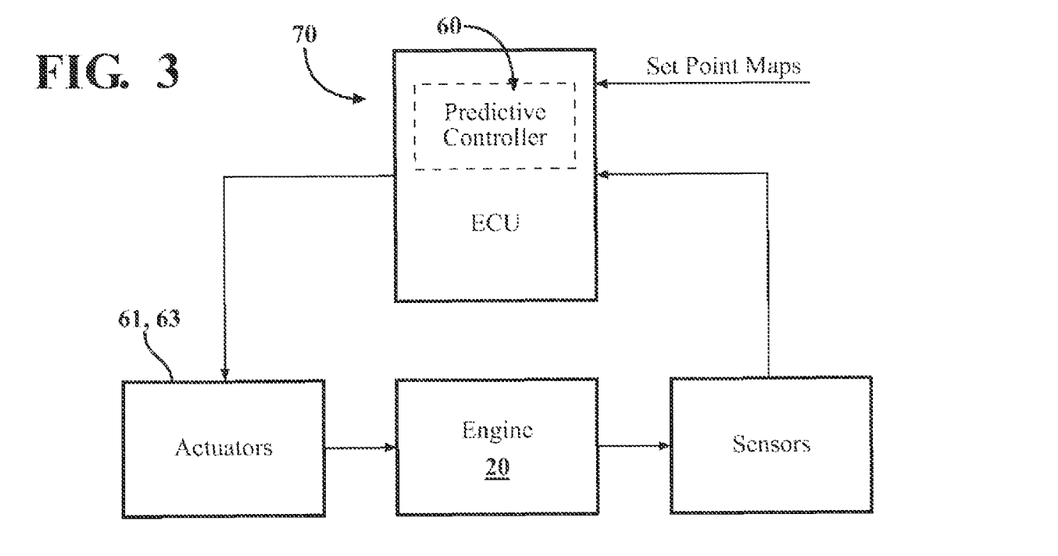
FIG. 3 is a schematic block diagram of an engine using the rate-based predictive model controller of FIG. 2.

An explicit MPC solution can be computed and is used in the ECU 70, FIG. 3, rather than one based on on-board quadratic programming. This implementation is motivated by limited computing power and code simplicity.

The rate-based predictive model may include the following non-limiting elements or features:
  Set-point map that prescribes set-points for intake pressure and EGR rate;
  Prediction model based on reduced order linearization of the diesel engine model;
  Explicit Model Predictive Controller that generates requested VGT lift and requested EGR flow while enforcing time-varying constraints on intake pressure and maximum EGR flow;
  Partial Inversion block that computes VGT duty cycle (percent closed) and EGR valve position (percent open);
  Kalman filter estimates based on measurements of intake pressure, ECU estimated EGR rate, and mass air-flow (MAF);
  EGR throttle (% closed) controller that closes the throttle based on the margin between requested EGR flow and maximum EGR flow; and
  Markov Chain based MPC region selection process that searched is likelihood order for the appropriate region of the explicit Model Predictive Controller.

Figure 4:
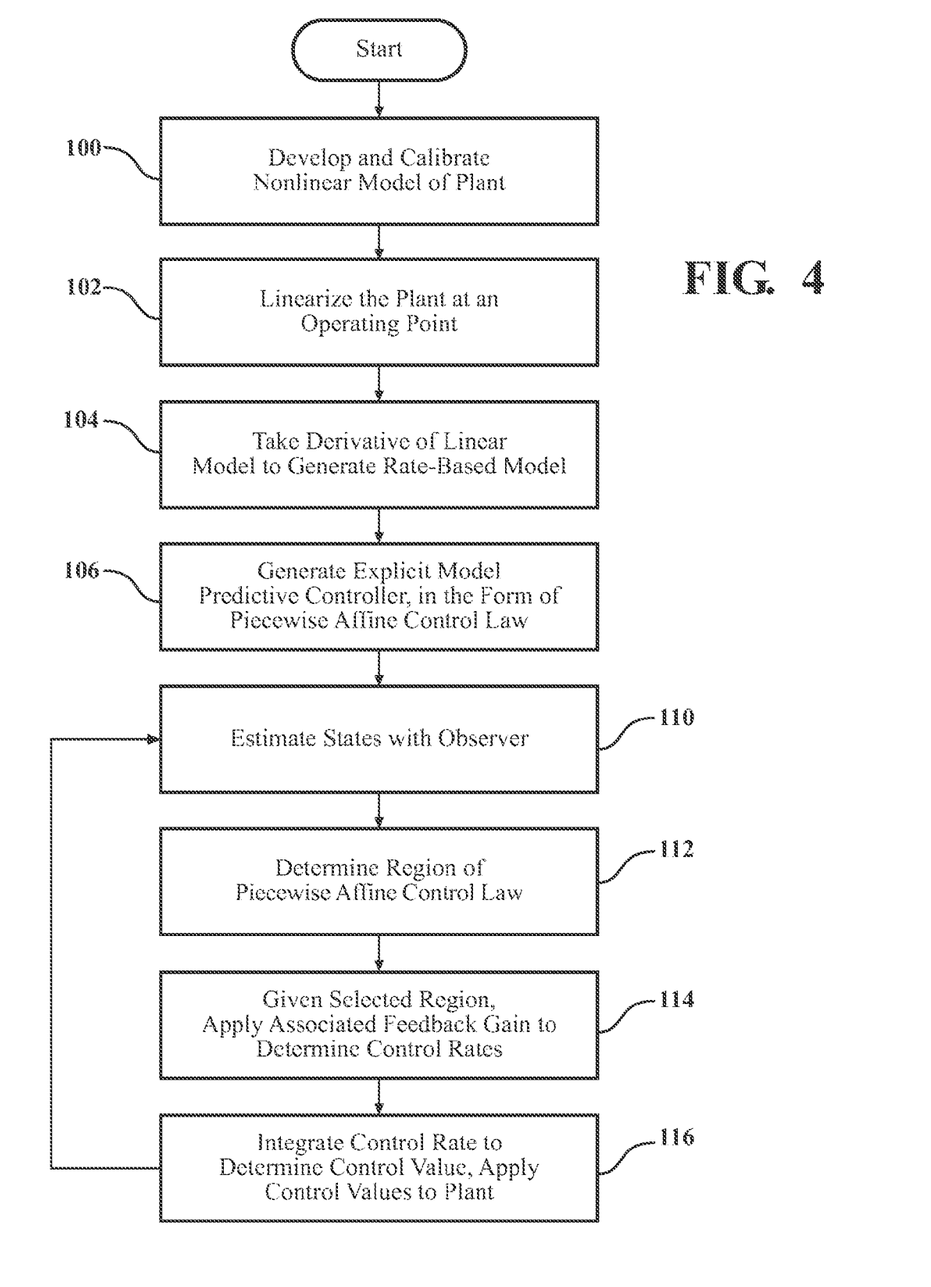
FIG. 4 is a flow diagram depicting the sequence steps and operating the rate-based predictive model control method.

The nonlinear model for the engine 20 can be developed in step 100, FIG. 4, using a mean value, gray-box modeling approach that utilized physics and data fits. The main dynamic states in the model are the intake manifold pressure, exhaust manifold pressure, pre-throttle pressure, turbocharger turbine speed, EGR cooler outlet temperature, intake manifold density, exhaust manifold density, intake manifold burn gas fraction, exhaust manifold burnt gas fraction, and engine temperature. The inputs to the model are engine speed, fuel rate, VGT duty cycle, and EGR throttle position.

To render the model more linear, the control inputs are chosen to be intake manifold pressure 62 and EGR valve flow rate 64 instead of VGT duty cycle and EGR valve position. The control strategy utilizes partial nonlinear inversion to recover VGT duty cycle and EGR valve position from the prescribed control inputs 62 and 64. The remaining inputs, namely, engine speed, fuel rate and EGR throttle position, remain unchanged. The outputs are chosen as VGT lift and EGR valve flow rate, and MAF, not shown. MAF is only used as an input to the Kalman filter.

The engine operating range (fuel rate and engine speed range) is divided into zones centered at selected operating points. At each operating point, the nonlinear model is linearized resulting in a $10^{th}$ order linear model. Balanced truncation is applied to reduce the model order. Based on the analysis of Hankel singular values and preliminary design, it was determined that the order of the linear model can be reduced by two. Since the states of the reduced order model are transformative of physical states, a state observer is used to estimate them from measured outputs. Lowering the order of the linear design and model is advantageous as the controller ROM size is reduced and the state observer is lower dimensional.

To formulate the rate-based predictive model, step 102, a $2^{nd}$ order continuous time linear model is used. A rate-based model, step 104, is then generated as a derivative of the linear model, as follows, $$\xi = [\dot{x}, y]^T \quad (2)$$

$$\dot{\xi} = \overline{A}\xi + \overline{B}_1 \dot{u} + \overline{B}_2 \dot{d}, \, y = \overline{C}\xi \quad (3)$$

$$\overline{A} = \begin{bmatrix} A & 0 \\ C & 0 \end{bmatrix}, \overline{B}_1 = \begin{bmatrix} B_1 \\ D_1 \end{bmatrix}, \overline{B}_2 = \begin{bmatrix} B_2 \\ D_2 \end{bmatrix}, \overline{C} = [0 \, I]) \quad (4)$$

where $\xi$ is an augmented state composed of the state derivative of the two reduced order states, and the outputs, y, intake pressure and EGR rate. The u is the vector of outputs (VGT lift, EGR valve flow), and d is the vector of measured disturbances, (EGR throttle position, engine speed, and fuel rate). The continuous time system realization corresponding A, $B_1$, $B_2$, C is then converted to discrete-time with a $T_s = 32_{m \, sec}$ sampling period to generate $A_d$, $B_{1d}$, $B_{2d}$, $C_d$ respectively. The rate-based prediction model (RB-MPC) has the following form:

$$\begin{bmatrix} \xi_{k+1} \\ u_{k+1} \\ \dot{d}_{k+1} \\ o_{k+1} \\ r_{k+1} \end{bmatrix} = \begin{bmatrix} \overline{A}_d & 0 & \overline{B}_{2d} & 0 & 0 \\ 0 & I & 0 & 0 & 0 \\ 0 & 0 & \lambda & 0 & 0 \\ 0 & 0 & 0 & I & 0 \\ 0 & 0 & 0 & 0 & I \end{bmatrix} \begin{bmatrix} \xi_k \\ u_k \\ \dot{d}_k \\ o_k \\ r_k \end{bmatrix} + \begin{bmatrix} B_{1d} \\ T_s \\ 0 \\ 0 \\ 0 \end{bmatrix} \dot{u}_k \quad (5)$$

The model will optimize the control rates $\dot{u}_k$. The states $u_k$ are current values of the controls. The $d_k$, the derivative of the measured disturbances, is augmented instead $0 \le \lambda \le 1$ is a prediction decay rate on the disturbance derivative and is chosen based on simulations. $o_k$ and $r_k$ are unchanged.

The incremental cost weights tracking error, control effort, and slack variables. The resulting optimization problem, assuming k=1 is the current time instant, has the following form, $$\text{minimize}(\xi_N - \xi_d)^T P(\xi_N \xi_d) + \Sigma_{i=1}^N (y_i - r_i)^T Q(y_i - r_i) + \dot{u}_i^T R \dot{u}_i + M\epsilon^2 \quad (6)$$

subject to control restraints:

$$u_{min} \le u_k \le u_{max}, \forall k=1 \ldots N \quad (7)$$

using a control horizon of 1:

$$\dot{u}_k = 0 \text{ for } k \ge 2, \quad (8)$$

and subject to a soft intake pressure overshoot constraint enforced intermittently at $n \in I \subset \{1, 2, \ldots, N_c\}$:

$$y_{MAP,n} - r_n \le o_{overshoot,n} + \epsilon, \quad (9)$$

$$\epsilon \ge 0. \quad (10)$$

where $\xi_d = [0r_N]^T$ is the desired steady state value. The terminal cost, $(\xi_N - \xi_d)^T P(\xi_N - \xi_d)$ uses the P matrix corresponding to the solution of the Algebraic Riccati Equation of the associated unconstrained LQ problem.

To reduce the number of regions in the explicit controller, the control horizon was chosen as a single step. Using MPC guidelines for selecting the prediction horizon, and after tuning the controller in simulation, the output constraint horizon was set as $N_C = 30$ steps and the prediction horizon as $N = 50$ steps.

The explicit MPC rate-based controller 60 is generated in step 106 in the form of a piecewise affine control law using a MPT toolbox for Matlab. The controller 60 has a piecewise affine control law form.

$$u_{k+1} = u_k + T_s(F_i x_{aug} + G_i), \text{ if } H_i x_{aug} \le K_k) \quad (11)$$

where $i \in \{1, \ldots, n_r\}$ denotes the ith polyhedral region, $(F_i^X{}_{aug+} G_i)$ gives the requested control rates, $\dot{u}$, and $$x_{aug} = \begin{bmatrix} \hat{\xi}_k \\ u_k \\ \dot{d}_k \\ o_k \\ r_k \end{bmatrix} \quad (12)$$

where $\Xi_k$ is the estimated plant model state. The total augmented state, $X_{aug}$, in (12) is of dimension 16.

Figure 5:
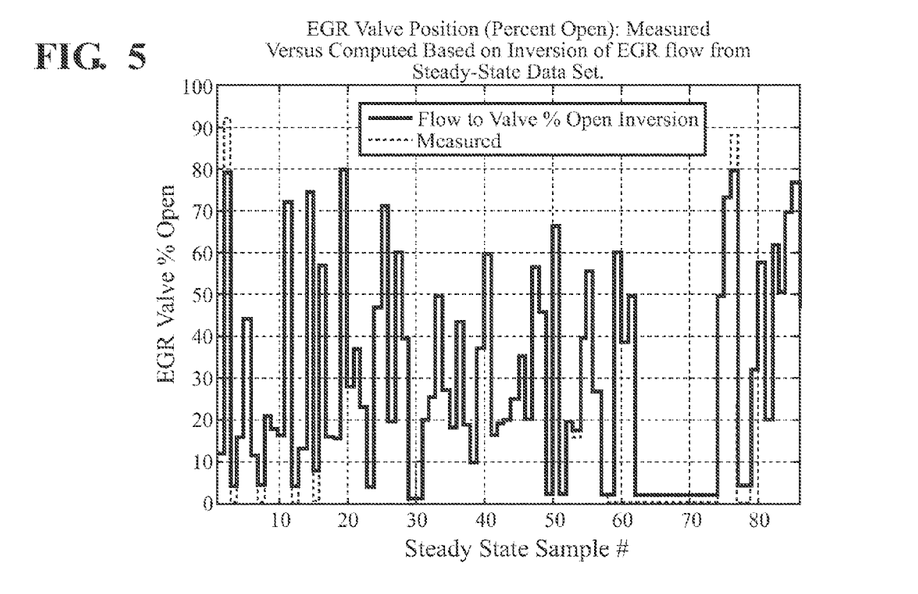
FIG. 5 is a graph depicting EGR valve position verses sample number.

Partial inversion is applied in the rate-based predictive model controller 60 to replace EGR valve position control signal by EGR flow control signal and to replace VGT duty cycle signal by VGT lift control signal. The EGR valve flow is a function of intake pressure, exhaust pressure, exhaust temperature, EGR valve position, and engine speed. The inversion of EGR flow to EGR valve position is described in Huang et al., Towards Combining Nonlinear and Predictive Control of Diesel Engines. *Proceedings of the* 2013 *American Control Conference*; Washington, D.C., USA, June 2013. Because EGR valve flow available as an ECU estimate, a PID controller can also be applied to the difference between EGR flow estimate and the requested EGR flow. FIG. 5 suggests that even without the PID controller, the inversion is sufficiently accurate. The discrepancies are compensated by the PID feedback and the by the outer loop MPC feedback.

Figure 6:
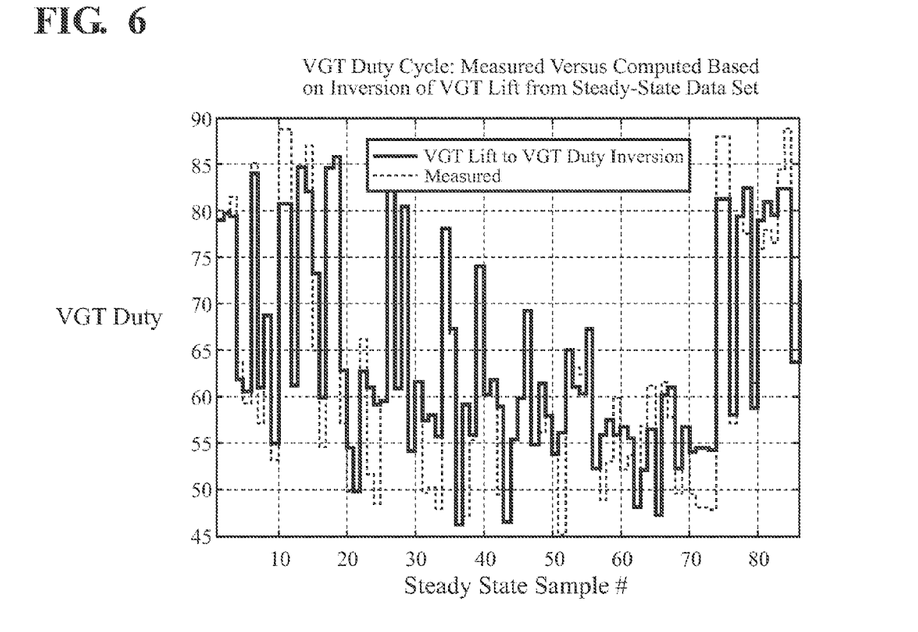
FIG. 6 is a graph depicting VGT duty cycle.

The partial inversion (but without dynamic compensation since VGT lift is not measured) is also used to convert VGT life requested by the MPC controller to a commanded VGT duty cycle. The pneumatic VGT actuator dynamics are complicated and involve hysteresis. Nevertheless, the model translates VGT lift, engine speed, exhaust pressure and exhaust temperature (that are available as ECU estimates) into VGT duty cycle, see FIG. 6.

The throttle controller is separate from the RB-MPC controller 60 and has the following form, $$\theta_{thr} = \begin{cases} \theta^{req} & \text{if } W_{egr}^{max} - W_{egr}^{req} > M_{egr} \\ \theta^{req} + C_{PID}(s)(M_{egr} - W_{egr}^{max} + W_{egr}^{req}) \\ & \text{otherwise} \end{cases} \quad (13)$$

The throttle controller sets the throttle position to the engine speed and fuel-dependent set-point, $\Theta^{req}$, prescribed by the throttle position feed-forward map, provided a margin, $M_{egr}$, is maintained between the requested EGR flow, $W_{egr}^{req}$, and the maximum feasible EGR flow, $W_{egr}^{max}$. If this margin is eroded, a PID controller, $C_{PID(s)}$, is applied to recover the margin by closing the EGR throttle.

Several strategies can be used to reduce computational complexity. Intermittent constraint enforcement is used to reduce the number of generated regions. Rarely visited regions are then removed. A Markov Chain region selection process is also used to reduce the average time required to identify the active region. Table 1 compares the worst-case computational complexity RB-MPC with enforcement of either 6 or 1 incremental intake pressure overshoot constraints. $n_z$ is the number of zones and $n_r$ is the number of regions per zone.

TABLE 1

|  | $n_z$ | $\Sigma n_r$ | [kB] | flops | [µs] |
|---|---|---|---|---|---|
| RB-MPC w/6 i.c. | 1 | 28 | 141.3 | 6551 | 406.2 |
| RB-MPC w/1 i.c. | 1 | 10 | 35.0 | 1615 | 100.0 |

Due to extensive simulations over typical drive cycles, rarely visited regions can be removed to reduce computational complexity. In addition, small regions, i.e., regions that have a small Chebyshey radius, can be removed. With region elimination, the selected region is given by $$i \in \text{argmin}_i \{\max_j \{H_j x_{aug} - K_{ij}\}\} \quad (14)$$

where j corresponds to jth inequality in the definition of the ith region to which $x_{aug}$ strictly belongs is found. For strategies that use intermittent constraint enforcement, around half of the region have been additional removed.

The number of regions depends on the number of possible combinations of active constraints. Hence, to reduce the number of regions, the approach of enforcing the constraints at all-time instants over the prediction horizon is modified by enforcing tightened constraints at a smaller number of time instants. The final design of RB-MPC 60 uses just a single time instant (20 steps ahead) to enforce the intake pressure overshoot constraint.

Figure 7:
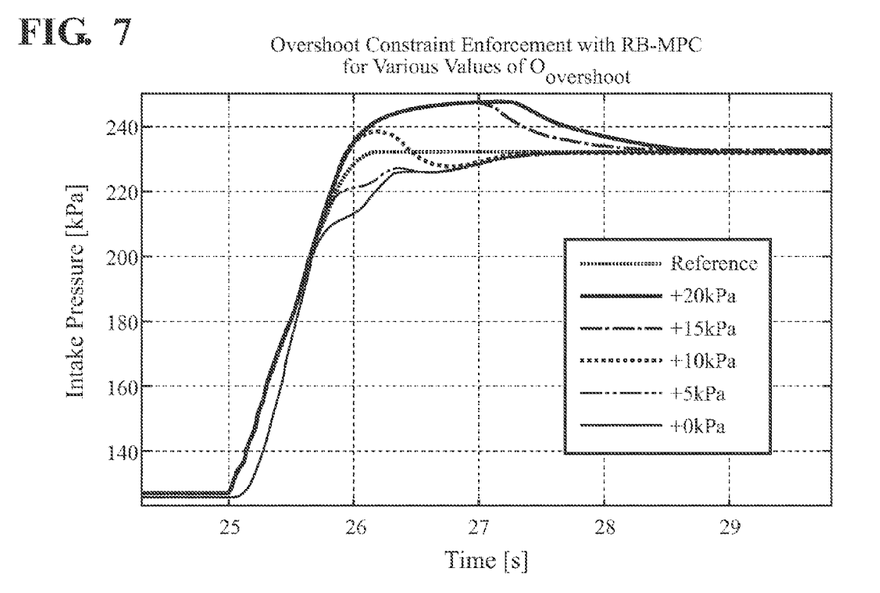
FIG. 7 is a graph depicting overshoot constraint enforcement.

FIG. 7 demonstrates this approach with RB-MPC controller 60. In this case, this approach is able to handle the overshoot constraint during a large step in fueling rate from 5 to 55 mm$^3$/stroke which corresponds to a 124 kPa to 232 kPa step in the intake pressure set-point. The transient behavior highlights the benefits of using a rate-based approach.

Figure 9:
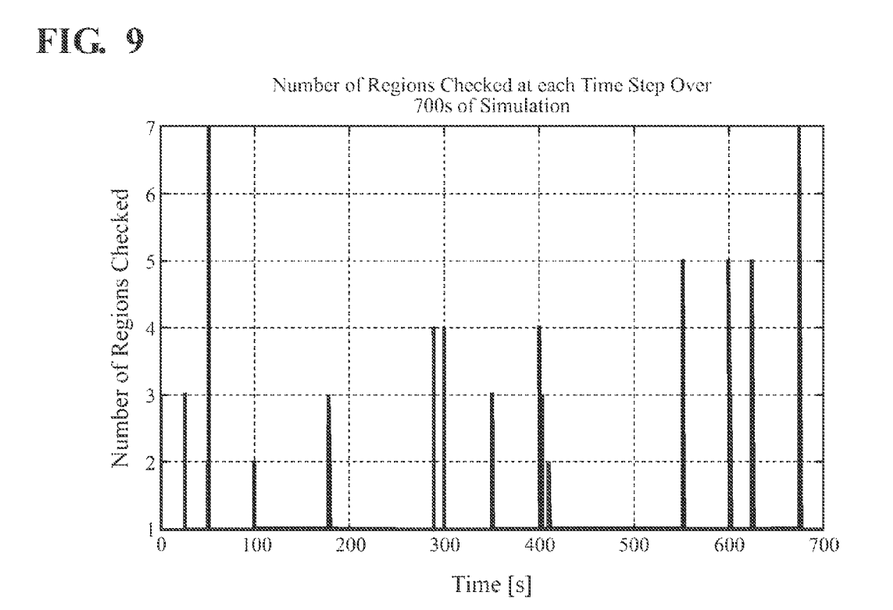
FIG. 9 a graph depicting number of regions sampled over time.
Figure 10:
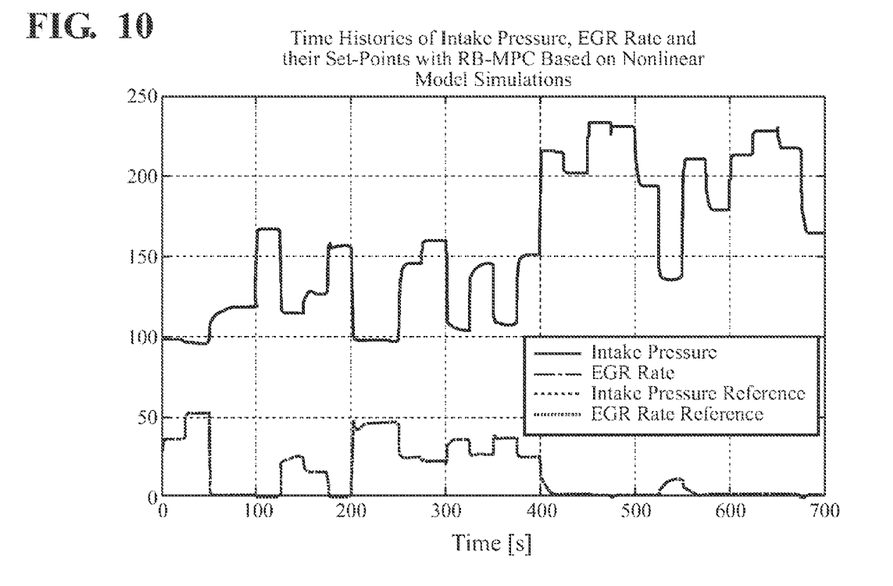
FIG. 10 is a graph depicting time histories of intake pressure and EGR rate.
Figure 11:
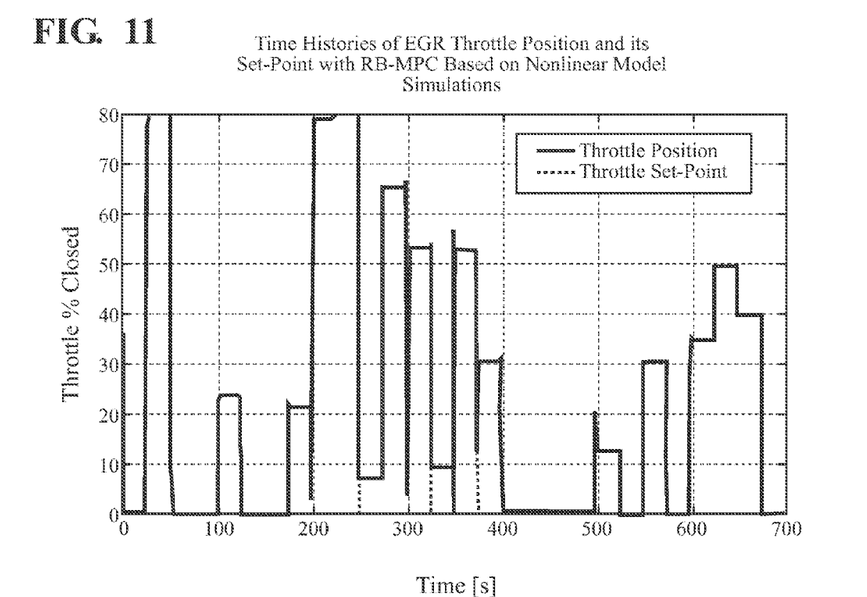
FIG. 11 is a graph depicting time histories of EGR throttle position.
Figure 12:
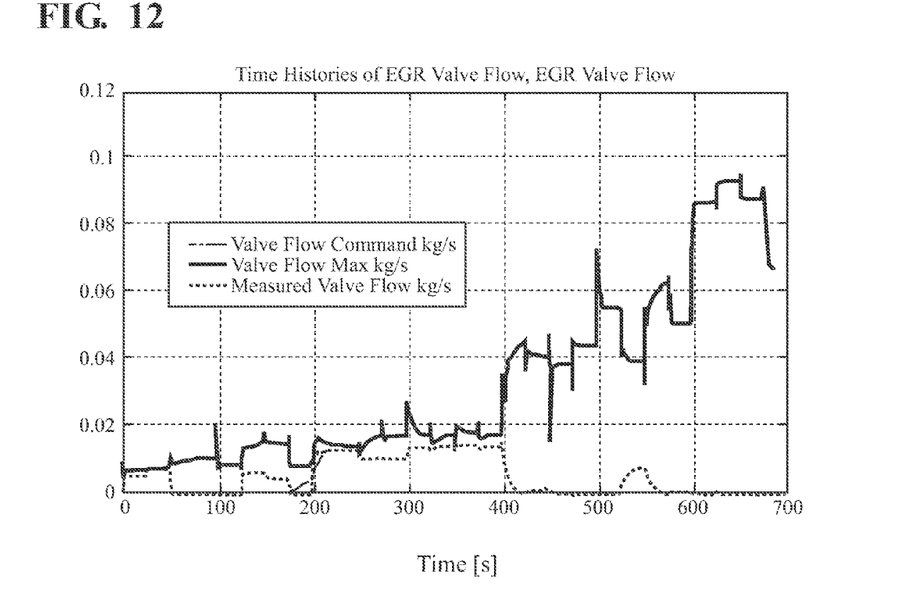
FIG. 12 is a graph depicting time histories of EGR valve flow and EGR valve flow commanded.
Figure 13:
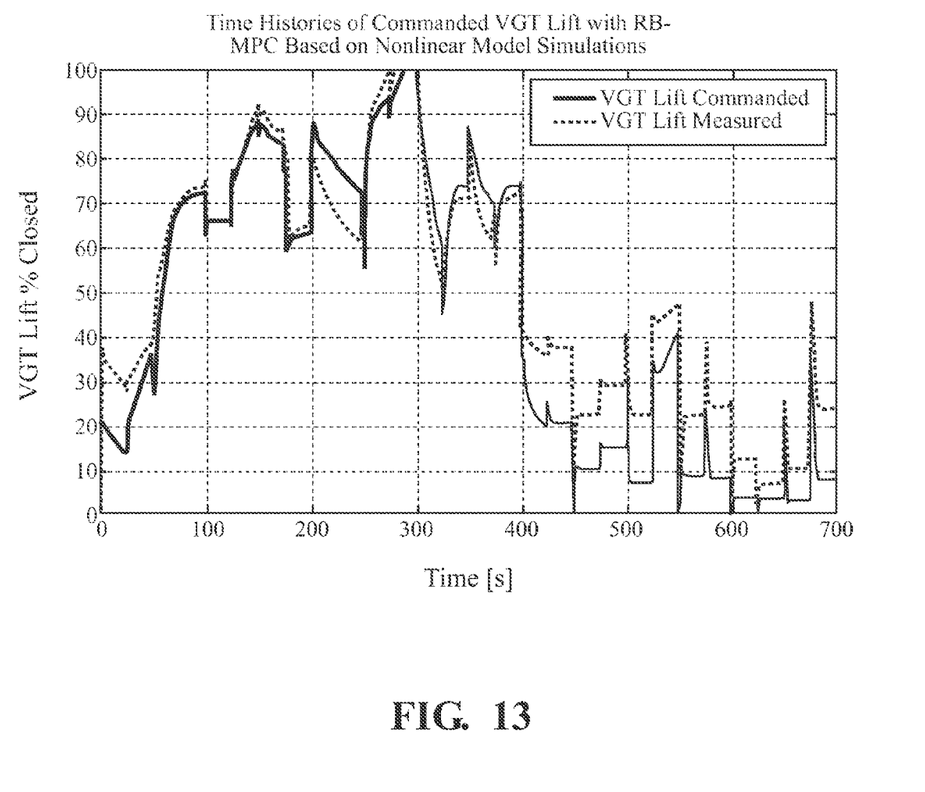
FIG. 13 is a graph depicting time histories of commanded VGT lift.

The performance benefit of RB-MPC is further exemplified in FIG. 9 which show the predicted trajectories for RB-MPC over a horizon N=50 steps.

In FIG. 9 the predicted trajectories for RB-MPC lie close to the true trajectory even though the linearization point at 1750 rpm is further from the stimulated operating condition, 3500 rpm, than a linearization point 3250 rpm.

Figure 8:
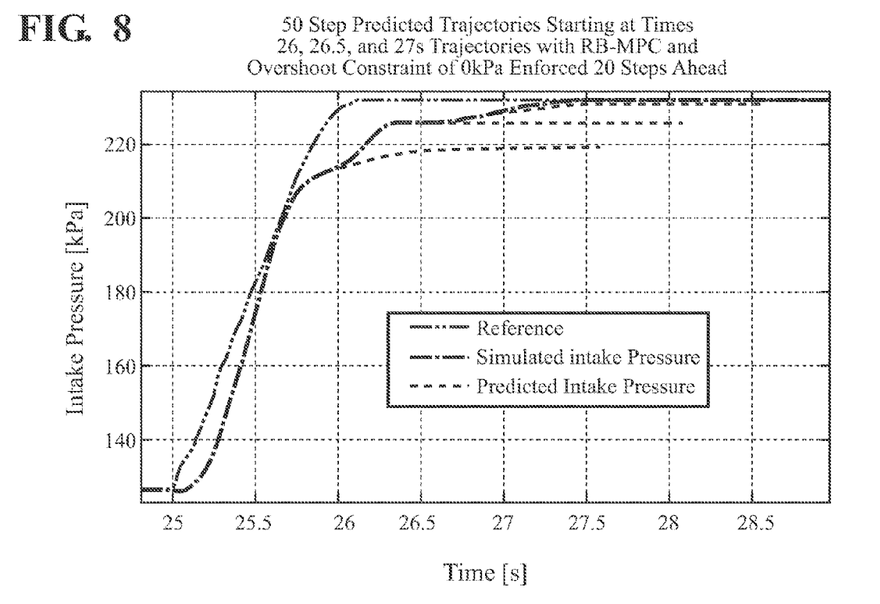
FIG. 8 is a graph depicting projected trajectories of intake pressure over time.

When using the RB-MPC controller 60, the computation cost is dominated by checking the inequality for each region. The Markov Chain process is intended to speed up the average case region selection process by searching for the region $x_{aug}$ is currently inside in likelihood order. From drive cycle stimulations and the trajectory of regions visited, a transition probability matrix for an associated Markov Chain model of region transitions is created. Each entry represents the probability of transitioning from the previous region, indexed by column. The probability transition matrix is then sorted to produce, for each previous region, the order in which to check for the current region. FIG. 8 shows the number of regions checked during this simulation. In the worst case, the computation time is the same as the one shown in Table 1. This corresponds to 10 regions checked if $x_{aug}$ is indeed in the 10$^{th}$ region, or if $x_{aug}$ is inside one of the removed regions. For the majority of the simulation, only a single region is checked. This is to be expected because generally $x_{aug}$ will stay in the same region as it was during the previous time step.

The simulation results of RB-MPC controller 60 on the nonlinear model of the engine 20 as shown in FIGS. 10-13. These figures show fuel step responses covering engine speed ranges from 1000 to 4000 rpm and fuel rates between 5 and 55 mm$^3$/stroke. Every 100 sec is a step up of engine speed by 500 rpm. A single RB-MPC controller 60 is used and the linearization point is located at 1750 rpm, 45 mm$^3$/stroke. The controller demonstrates good tracking performances and overshoots constraint handling through the entire operating range. As apparent from FIG. 11, the EGR throttle occasionally closes, e.g. at 25 sec, more than dictated by EGR throttle set-point to recover EGR flow margin.

Referring back to FIG. 4, once the rate base predictive model controller 60 is generated in step 106, the controller 60 is implemented in the ECU 70 of the engine 20 as shown in FIG. 3.

The ECU 70 has a processor that executes a computer program tangibly embodied on computer useable medium and comprising instructions that when executed by the processor implement the rate-based predictive model controller described above.

The ECU 70 may include a central processing unit which may any type of device, or multiple devices, capable of manipulating or processing information. The central processing unit is practiced with a single processor or multiple processors.

The central processing unit accesses a memory, which can be a random access memory or any other suitable type of storage device. The memory can include code and data that is accessed by the central processing unit. The memory can further include an operating system and application programs, including the rate-based predictive model controller used to perform the method described herein. In various aspects, a non-transitory computer storage media may be utilized having embodied thereon computer-useable instructions that, when executed, perform various methods for controlling an internal combustion engine according to the present teachings.

The ECU 70 using the rate-based predictive model controller 60 may estimate the engine state space that is divided into regions by means of an algorithm or formulas. Once the state is determined in state 110, the ECU 70, via the rate-based predictive model controller 60, determines, by using the estimated state in step 108, the region of a piecewise affine control law generated in step 112.

Once a region is determined in step 112, the ECU 70, via the rate-based predictive model controller 60, in step 114, applies a feedback gain, stored in memory, which is associated with the selected region to determine the control rates of the respective engine actuator 61, 63. Finally, the ECU 70, via the rate-based predictive model controller 60, in step 116, integrates the determined control rate from step 114 to determine a control value for the actuator 61 or 63, which is then applied by the ECU 70 to the actuator for the outputs 61 or 63.

Figure 14:
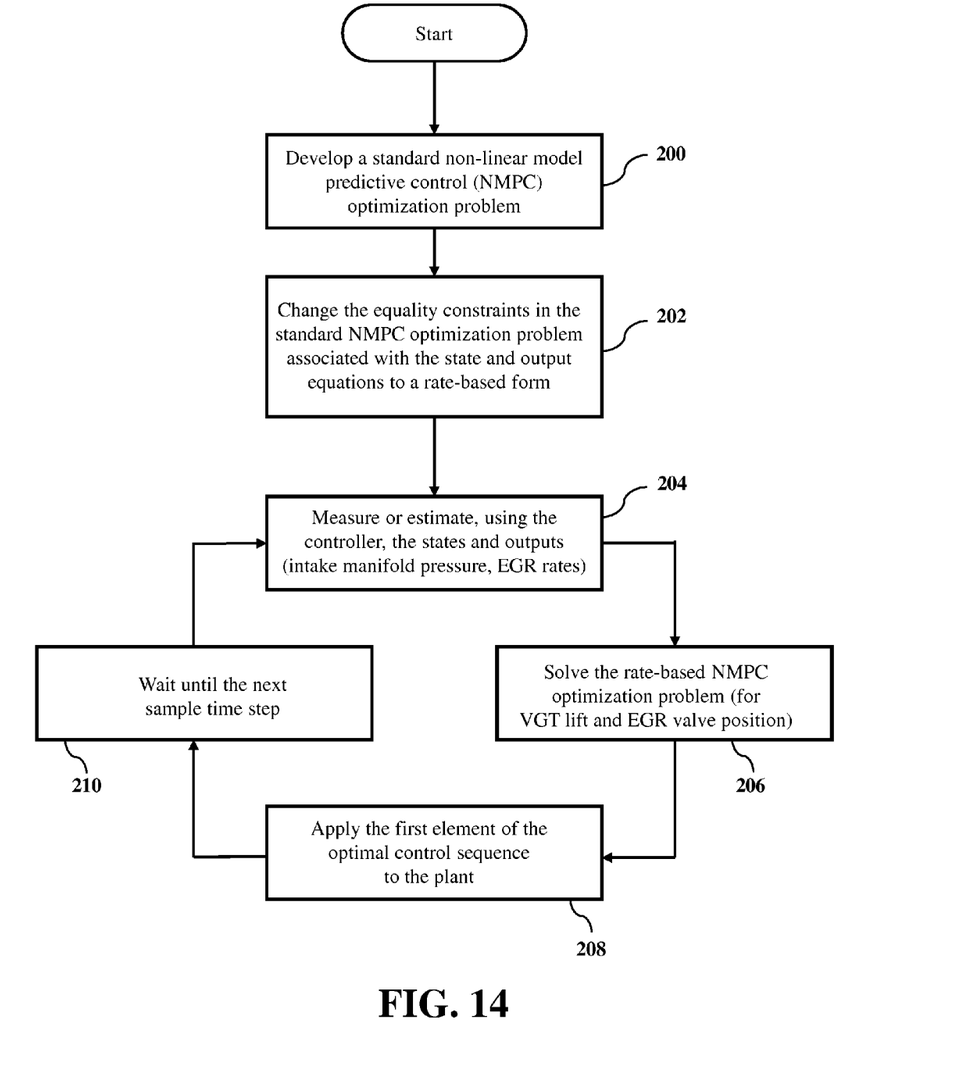
FIG. 14 is an alternative flow diagram from FIG. 4, depicting the sequence steps and operating a discrete time rate-based predictive model control method.

FIG. 14 is an alternative flow diagram from FIG. 4, depicting the sequence steps and operating a discrete time rate-based non-linear predictive model control method. Similar to the method steps described above as related to FIG. 4, the methods of FIG. 14 also use the ECU 70 and controller 60, but the controller is able to develop a non-linear predictive model without the need to separate the plant model into regions and linearize each region. The method of FIG. 14 is a rate-based NMPC for an internal combustion engine air path control that is able to achieve zero-offset steady-state tracking while bypassing common issues associated with the strategy of using a disturbance estimator, e.g., discontinuous zone switching, and the need to separately tune the estimator and feedback controller.

For a discrete time rate-based non-linear model predictive control, ideas similar to linear discrete time rate-based model predictive control may be used. With reference to step 200, a standard non-linear model predictive optimization problem is formed. State update equations may be needed for $\Delta x_k = x_k - x_{k-1}$, thus the discrete time model may have the form, $$x_{k+1} = f^d(x_k, u_k). \quad (15)$$

$$y_k = f'(x_k, u_k). \quad (16)$$

where the state and output equations (15) and (16) are equality constraints from the standpoint of the optimal control problem, with reference to step 202. For example, an equivalent constraint to (15) and (16) is $$\Delta x_{k+1} = x_{k+1} - x_k = f^d(x_k, u_k) - f^d(x_{k-1}, u_{k-1}), \quad (17)$$

$$\Delta y_k = y_k - y_{k-1} = f'(x_k, u_k) - f'(x_{k-1}, u_{k-1}). \quad (18)$$

Using the constraints (17) and (18), the following discrete time rate-based non-linear model predictive control cost function, $$J_{DRB} = \phi(x_{N|k} - x_{N-1|k}, y_{N|k} - r) + \sum_{i=0}^{N-1} (y_{i|k} - r)^T Q(y_{i|k} - r) + (u_{i|k} - u_{i-1|k})^T R(u_{i|k} - u_{i-1|k}) \quad (19)$$

is minimized subject to the constraints, $$x_{i+1|k} - x_{i|k} = f^d(x_{i|k}, u_{i|k}) - f^d(x_{i-1|k}, u_{i-1|k}), \quad (20)$$

$$y_{i|k} - y_{i-1|k} = f'(x_{i|k}, u_{i|k}) - f'(x_{i-1|k}, u_{i-1|k}), \quad (21)$$

$$g(x_{i|k}, u_{i|k}) = 0, \quad (22)$$

$$h(x_{i|k}, u_{i|k}) \leq 0, \quad (23)$$

$$\psi(x_{N|k} - x_{N-1|k}, y_{N|k} - r) \leq 0, \quad (24)$$

$$x_{0|k} = x_k, x_{-1|k} = x_{k-1}, y_{0|k} = y_k, y_{-1|k} = y_{k-1}, u_{-1|k} = u_{k-1}. \quad (25)$$

As shown in step 204, the states, such as intake manifold pressure and EGR rates are measured or otherwise estimated by the controller. Thereafter, as referenced by step 206, the rate-based NMPC optimization problem is solved, for example, for VGT lift position and EGR valve position. Once those values are solved, the controller can apply the first element of the control sequence to the plant, as shown by step 208. Once the next sample time step has passed, noted by step 210, additional measurements can be obtained or measured, returning to step 204.

Figure 15:
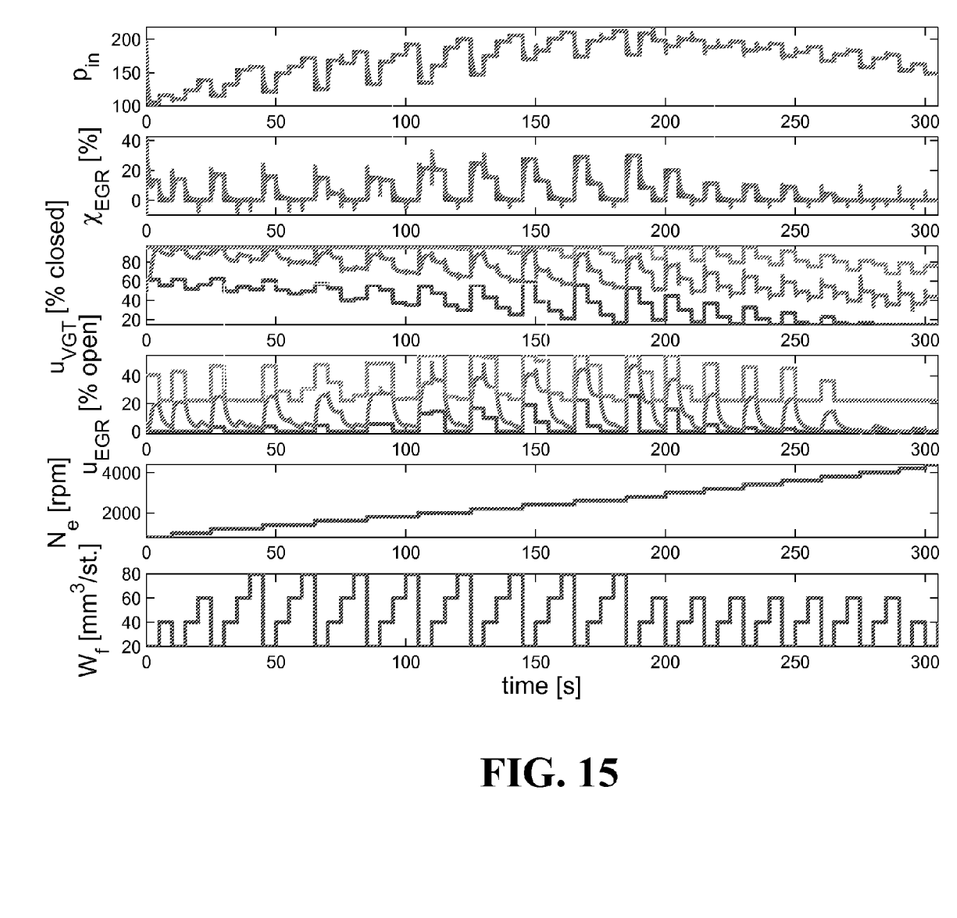
FIG. 15 is a collection of graphs illustrating a closed loop simulation using discrete time rate-based non-linear model predictive control in loop with a Toyota GD engine mean-value-model.

FIG. 15 illustrates various charts for a closed loop simulation using discrete time rate-based non-linear model predictive control (with polynomial prediction model) in loop with the Toyota GD engine mean-value-model. The control objective is to track intake manifold pressure ($p_{in}$) and EGR rate ($x_{EGR}$) through coordinated control of VGT position ($u_{VGT}$) and EGR position ($u_{EGR}$). The prediction horizon is N=5 with a sampling period and discretization period of $\Delta T = \Delta \tau = 32$ msec. The controller uses the rate-based formulations (19)-(23) and (25), above, with the exterior penalties for control constraint enforcement, multiple shooting to facilitate easy generation of the Jacobian of the necessary conditions, and a single Newton (not Kantorovich) step per sample instant. As can be seen, the rate-based non-linear model predictive control is able to successfully achieve zero-offset steady-state tracking without any estimators, adaption, or feed-forward. For the upper portion of FIG. 15, with the top two charts, the plots for intake manifold pressure ($p_{in}$) and EGR rate ($x_{EGR}$ [%]) include both a reference point and a closed loop response that generally matches with the reference. For the center portion of FIG. 15, with the middle two charts, the plots for EGR position ($u_{EGR}$ [% open]) and VGT position ($u_{VGT}$ [% closed]) include the closed loop response along with minimum and maximum values.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A system for optimizing engine operation, the system comprising:
    an internal combustion engine; and
    a controller configured to control a variable geometry turbine (VGT) and an exhaust gas recirculation (EGR) valve during engine operation, the controller developing a non-linear discrete time rate-based predictive model responsive to engine operating parameters and able to achieve zero-offset steady state tracking, and using the non-linear discrete time rate-based predictive model to generate a VGT position and an EGR valve position, wherein operation of the internal combustion engine continues based on the generated VGT position and EGR valve position.

2. The system of claim 1, wherein the engine operating parameters comprise engine intake manifold pressure and EGR rate.

3. The system of claim 2, wherein the controller is configured to measure or estimate at least one of the intake manifold pressure and the EGR rate.

4. The system of claim 1, wherein the internal combustion engine is a diesel engine.

5. A method for controlling an internal combustion engine, the method comprising:
    obtaining intake manifold pressure and EGR rate measurements or estimates;
    developing, using a controller, a non-linear discrete time rate-based predictive model responsive to the intake manifold pressure and EGR rate measurements and able to achieve zero-offset steady state tracking;
    using the non-linear discrete time rate-based predictive model to generate, by the controller, a VGT position and an EGR valve position; and
    controlling operation of the internal combustion engine based on the generated VGT position and EGR valve position.

6. The method according to claim 5, wherein the internal combustion engine is a diesel engine.

7. The method according to claim 5, wherein the controller is configured to measure or estimate at least one of the intake manifold pressure and the EGR rate.

8. A non-transitory computer storage media having embodied thereon computer-useable instructions that, when executed, perform a method for controlling an internal combustion engine, the method comprising:
    obtaining intake manifold pressure and EGR rate measurements or estimates;
    developing, using a controller, a non-linear discrete time rate-based predictive model responsive to the intake manifold pressure and EGR rate measurements or estimates and able to achieve zero-offset steady state tracking;
    using the non-linear discrete time rate-based predictive model to generate, by the controller, an VGT position and an EGR valve position; and
    controlling operation of the internal combustion engine based on the generated VGT position and EGR valve position.

9. The non-transitory computer storage media as recited in claim 8, wherein the method comprises controlling a diesel engine.

10. The non-transitory computer storage media as recited in claim 8, wherein the method step of obtaining intake manifold pressure and EGR rate measurements or estimates is performed by the controller.

* * * * *